(12) United States Patent
Konrad

(10) Patent No.: US 6,853,685 B1
(45) Date of Patent: Feb. 8, 2005

(54) CIRCUIT ARRANGEMENT FOR THE ELECTRICALLY ISOLATED TRANSFER OF DIGITAL SIGNALS

(76) Inventor: Stephan Konrad, Kirchenweg 5, D-87669 Rieden (DE)

(*) Notice: Subject to any disclaimer, the term of this patent is extended or adjusted under 35 U.S.C. 154(b) by 0 days.

(21) Appl. No.: 09/354,689

(22) Filed: Jul. 16, 1999

Related U.S. Application Data

(60) Provisional application No. 60/109,786, filed on Nov. 25, 1998.

(30) Foreign Application Priority Data

Jul. 17, 1998 (EP) .......................................... 99 11 3334

(51) Int. Cl.[7] .............................................. H04B 3/00
(52) U.S. Cl. ...................................................... 375/258
(58) Field of Search ................................ 375/257, 258, 375/286, 219, 220, 272

(56) References Cited

U.S. PATENT DOCUMENTS

| | | | |
|---|---|---|---|
| 5,384,808 A | | 1/1995 | Van Brunt et al. |
| 5,418,933 A | | 5/1995 | Kimura et al. |
| 5,627,480 A | | 5/1997 | Young et al. |
| 5,724,237 A | * | 3/1998 | Hunter ........................ 363/65 |
| 5,812,597 A | * | 9/1998 | Graham et al. ............. 375/257 |
| 5,952,849 A | * | 9/1999 | Haigh .......................... 326/82 |

FOREIGN PATENT DOCUMENTS

| | | |
|---|---|---|
| DE | 25 55 045 A | 6/1977 |
| DE | 3614832 | 11/1987 |
| DE | 295 14 238 U | 10/1995 |
| EP | 0 198 263 | 10/1986 |
| EP | 0 198 263 B1 | 10/1986 |
| WO | WO 89/12366 | 12/1989 |
| WO | WO 94/11977 | 5/1994 |
| WO | WO 98/37672 | 8/1998 |

OTHER PUBLICATIONS

Horowitz et al., "Basic Logic Concepts", *The Art of Electronics*, Cambridge University Press 1989, pp. 471, 472, 479, 506, 507, 517 and 518.

* cited by examiner

*Primary Examiner*—Kevin Burd
(74) *Attorney, Agent, or Firm*—Bose McKinney & Evans LLP

(57) ABSTRACT

For the electrically isolated transmission of digital signals, an isolating path of a channel formed by a transformer is used. The channel further includes a conversion stage for converting the digital signal to a transmissible coupling signal and a conversion stage for converting a coupling signal to the digital signal. This conversion is accomplished by a monostable multivibrator. The coupling signal is a square-wave voltage which is generated by a delay circuit in the conversion stage and is converted on the isolating path to a square-wave voltage serving as the coupling signal.

28 Claims, 5 Drawing Sheets

CIRCUIT ARRANGEMENT FOR THE ELECTRICALLY ISOLATED TRANSFER OF DIGITAL SIGNALS This application claims the benefit of U.S. Provisional Application No. 60/109,786 filed Nov. 25, 1998.

BACKGROUND OF THE INVENTION

This invention relates to a transmission channel for the electrically isolated transmission of digital signals.

Prior-art transmission channels of this kind are frequently used for the transmission of digital signals by means of signal transmission lines, particularly over great distances, and serve to separate the potentials between the transmitter and receiver units of a data communications system. Such potential isolation is necessary to suppress interference signals caused by transient currents on the signal transmission lines.

Because of their high efficiency, transformers are often used to provide electrical isolation. Due to the effect of the inductances of transformers, however, the use of the latter reduces the edge steepness of the digital signal, so that this method may be unsuitable. In addition, transformers also transfer electromagnetic interference introduced to them, and the suppression of such interference involves a considerable amount of technical complexity. DE-A 36 14 832, WO-A 89/12 366, and EP-A 198 263 each disclose a transmission channel for transmitting digital signals—with a first digital-signal port for a first digital signal to be transmitted and—with a second digital-signal port for a transmitted second digital signal. The transmission channel comprising:—an isolating path with a predeterminable isolation capability;—a first conversion stage; and a second conversion stare. The first conversion stage including a coupling-signal port for a first coupling signal transmissible across the isolating path. The second conversion stage including a coupling-signal port for a third coupling signal transmissible across the isolating path. The isolating path being provided between a coil of the first conversion stage and a coil of the second conversion stage. The second conversion stage converting the second coupling signal to the second digital signal by means of a flip-flop having a set input coupled to the second coupling-signal port and having an output coupled to the second digital-signal port.

If signals are to be transmitted between two transmitter/receiver units, such electrically isolating circuit arrangements must also be operable bidirectionally, i.e., in a first and a second direction of transmission. This is not possible with the prior-art transmission channels described.

Another disadvantage associated with the use of flip-flops in such transmission channels is that their on state is not defined.

SUMMARY OF THE INVENTION

It is therefore an object of the invention to provide a transmission channel for the electrically isolated transmission of digital signals by means of transformers wherein the direction of transmission can be changed during operation.

Another object is to provide a circuit arrangement for the electrically isolated transmission of digital signals by means of a transformers which remains in an unambiguous, static state before and after the transmission of a digital signal. The digital signal transmitted by means of this circuit arrangement is to have a sufficient edge steepness.

To attain this object, a first variant of the invention provides a transmission channel for transmitting digital signals, with a first digital-signal port for a first digital signal to be transmitted, and with a second digital-signal port for a transmittec second digital signal. The transmission channel comprising an isolating path with a predeterminable isolation capability; a first conversion stage; and a second conversion stage. The first conversion stage having a coupling-signal port for a first coupling signal transmissible across the isolating path. The second conversion stage having a coupling-signal port for a third coupling signal transmissible across the isolating path. The isolating path being provided between a coil of the first conversion stage and a coil of the second conversion stage. The second conversion stage converting the second coupling signal to the second digital signal by means of a monostable multivibrator having a set input coupled to the second coupling-signal port and having an output coupled to the second digital-signal port.

A second variant of the invention provides a transmission channel for transmitting digital signals in a first direction selectable during operation or in a second direction selectable during operation, with a deactivatable first digital-signal port for a first digital signal to be transmitted, a deactivatable second digital-signal port for a transmitted second digital signal, a deactivatable third digital-signal port for a third digital signal to be transmitted, and a deactivatable fourth digital-signal port for a transmitted fourth digital signal. The transmission channel comprising a single isolating path with a predeterminable isolation capability; a first conversion stage and a second conversion stage. The first conversion stage having a coupling-signal port for a first coupling signal transmissible across the isolating path or for a second coupling signal transmissible across the isolating path. The second conversion stage having a coupling-signal port for a third coupling signal transmissible across the isolating path or for a fourth coupling signal transmissible across the isolating path. The isolating path being provided between a coil of the first conversion stage and a coil of the second conversion stage. The third digital-signal port and the fourth digital signal port being deactivated when the first direction of transmission has been selected. The first digital-signal port and the second digital-signal port being deactivated when the second direction of transmission has been selected.

In a first embodiment of the first variant of the invention, the multivibrator comprises a capacitor of predeterminable capacitance, a resistor of predeterminable resistance, a first inverter, and a second inverter. The capacitor of predeterminable capacitance having a first capacitor terminal and a second capacitor terminal. The resistor of predeterminable resistance having a first resistor terminal connected to the second capacitor terminal and a second resistor terminal connected to a reference potential. The first inverter having an inverter input connected to a first coil terminal of the second coil and an inverter output connected to a first capacitor terminal. The second inverter having an inverter input connected to the second capacitor terminal and an inverter output connected to a second coil port of the second coil.

In a first embodiment of the second variant of the invention, the transmission channel comprises a first selection-signal port for a first selection signal serving to deactivate the first digital-signal port or the third digital-signal port; and a second selection-signal port for a second selection signal serving to deactivate the second digital-signal port or the fourth digital-signal port.

In a second embodiment of the second variant of the invention, the transmission channel comprises a first tri-state buffer, a second tri-state buffer, a third tri-state buffer, and a fourth tri-state buffer. The first tri-state buffer having an input coupled to the first digital-signal port. The second tri-state buffer having an output coupled to the second digital-signal port. The third tri-state buffer having an input coupled to the third digital-signal port. The fourth tri-state buffer having an output coupled to the fourth digital-signal port. If the first direction of transmission has been selected, the first and second tri-state buffers are in a low-impedance state and the third and fourth tri-state buffers are in a high-impedance state. If the second direction of transmission has been selected, the first and second tri-state buffers are in a high-impedance state and the third and fourth tri-state buffers are in a low-impedance state.

In a third embodiment of the second variant of the invention, the second conversion stage comprises a multivibrator having at least one stable state.

In a fourth embodiment of the second variant of the invention, the multivibrator has two stable states.

In a fifth embodiment of the second variant of the invention, the multivibrator comprises a noninverting amplifier circuit having an input coupled to a first coil port of the second coil and having an output coupled to the second coil port of the second coil.

In a sixth embodiment of the second variant of the invention, the multivibrator has a single stable state.

In a second embodiment of the first variant of the invention or in a eight embodiment of the second variant, the first conversion stage comprises a delay circuit providing a predeterminable delay and having an input fed by the first digital signal and an output coupled to the second coil port of the first coil.

In a ninth embodiment of the first second variant of the invention, the delay circuit comprises a tri-state buffer.

In a third embodiment of the first variant of the invention or in a tenth embodiment of the second variant, the first coupling signal and/or the third coupling signal are three-valued logic signals.

In a fourth embodiment of the first variant of the invention and in a eleventh embodiment of the second variant, the first coupling signal and/or the third coupling signal are a voltage appearing across the coil of the first conversion stage.

One advantage of the invention is that the edge steepness of the transmitted digital signals is not reduced. This means that the digital signals appearing at the output of the circuit arrangement have the same edge steepness as those applied at the input.

Another advantage of the invention is that because of the reference potential at the respective switching stage, the circuit arrangement has a defined quiescent level, to which it returns after each signal transmission.

BRIEF DESCRIPTION OF THE DRAWINGS

The invention and further advantages will become more apparent from the following description of embodiments when taken in conjunction with the accompanying drawings. Throughout the figures, like parts are designated by like reference characters. In the drawings.

DETAILED DESCRIPTION OF PREFERRED EMBODIMENTS

Figure 1:
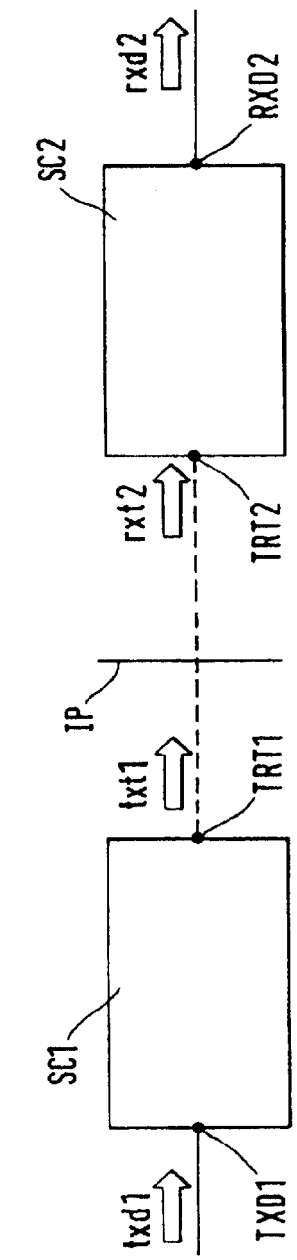
FIG. 1 is a schematic block diagram of a transmission channel for the electrically isolated transmission of digital signals.

FIG. 1 shows a schematic block diagram of a transmission channel for the electrically isolated transmission of digital signals, particularly of binary signals, between a first and a second transmitter/receiver unit (not shown) in a selected direction of transmission. The digital signal can be any two-valued electric signal of predeterminable pulse width and pulse repetition rate and of predeterminable mark-to-space ratio.

The transmission channel comprises a first digital-signal port TXD1 for a first signal to be transmitted, txd1, and a second digital-signal port RXD2 for a transmitted second digital signal rxd2.

The transmission channel further comprises a first conversion stage SC1 with a coupling-signal port TRT1, a second conversion stage SC2 with a coupling-signal port TRT2, and an isolating path IP between the coupling-signal ports TRT1, TRT2, which has a predeterminable isolation capability. The isolation capability of the isolating path IP is dependent on dielectric strength and electric conductivity. It increases with increasing dielectric strength and/or decreasing conductivity.

The conversion stage SC1 serves to convert the digital signal txd1 applied at the digital-signal port TXD1 to a first coupling signal txt1, which appears at the coupling-signal port TRT1 and is transmissible across the isolating path IP. The conversion stage SC2 serves to convert a second coupling signal rxt2, transmitted across the isolating path IP and applied at the coupling-signal port TRT2, to the digital signal rxd2 appearing at the digital-signal port RXD2.

Similarly, the isolating path IP, on the one hand, serves to change the coupling signal txt1 at the coupling-signal port TRT1 into the coupling signal rxt2 at the coupling-signal port TRT2. On the other hand, it also serves to prevent interference signals caused, for example, by potential differences along the transmission channel, from getting into the coupling signal rxt2, and thus into the digital signal rxd2.

Figure 2:
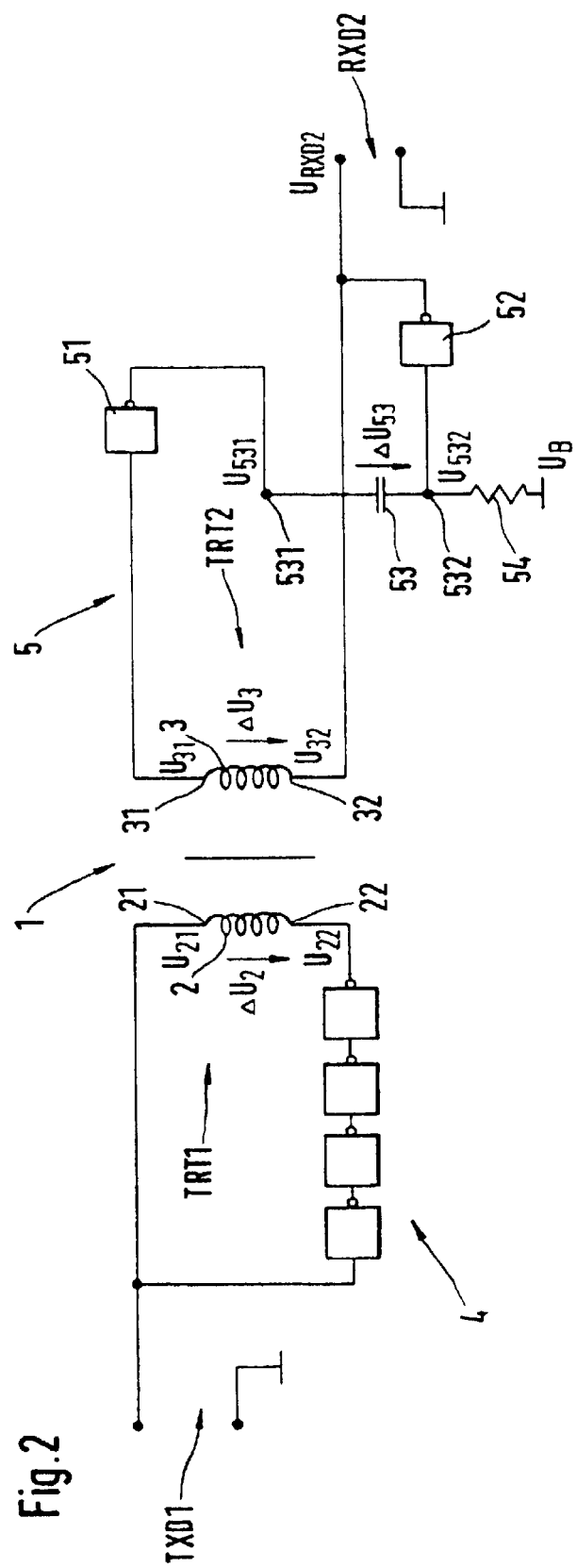
FIG. 2 is a schematic circuit diagram of the channel of FIG. 1, comprising a monostable multivibrator.

In the preferred embodiment shown in FIG. 2, the isolating path EP is implemented by a transformer air gap between a coil 2 of the conversion stage SC1, which serves as a first transformer winding, and a coil 3 of the conversion STAGE SC2, which serves as a second transformer winding. If necessary, it can also be implemented, for example, with an isolating path of a transformer embedded in insulating material and/or with two or more successive isolating paths of transformers connected in parallel.

The coil 2 has a first terminal 21 connected to a first potential $U_2$, and a second terminal 22 connected to a second potential $U_{22}$, while the coil 3 has a first terminal 31 connected to a third potential $U_3$, and a second terminal 32 connected to a fourth potential $U_3$. The two coils 2, 3 are so arranged relative to each other that during operation of the transmission channel, a stray magnetic field generated in one of the coils 2, 3 is coupled into the respective other coil 3, 2. The coupling signals txt1, txt2 can thus be time-varying current or voltage signals, particularly pulse signals; cf. DE-A 36 14 832, WO-A 89/12 366, and EP-A 198 263.

During operation of the transmission channel, if the digital signal txd1 is fed in, the potentials $U_{21}$, $U_{22}$, $U_{31}$, $U_{32}$ have values which, as shown in FIGS. 3a, 3b, 4e, and 4f, are assigned to a first logic state H (high) and a second logic state L (low). The H state covers a first range of potential or voltage values which has a first upper limit $H_O$ and a first lower limit $H_U$. The L state covers a second range of potential or voltage values which has a second upper limit $L_O$ and a second lower limit $L_U$. The two ranges of values do not overlap, i.e., the first lower limit $H_U$ is higher than the second upper limit $L_O$.

Figure 3A:
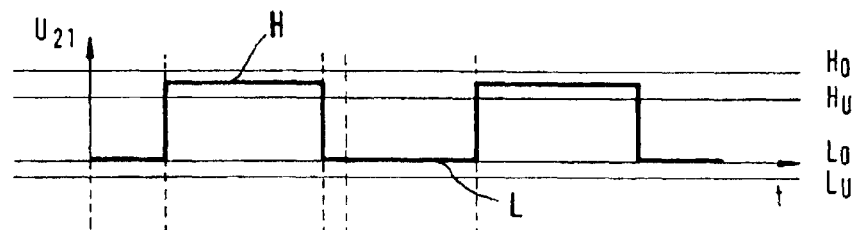
FIGS. 3a to 3d.
Figure 3B:
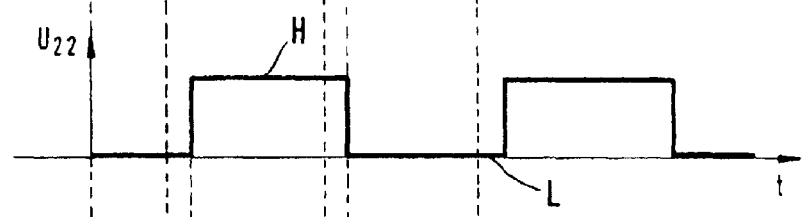
Figure 3C:
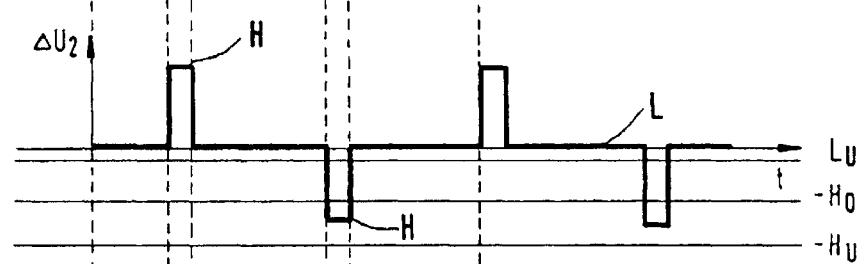

In one embodiment of the invention, the coupling signal txt1 is a first voltage $U_2$ which, in operation, assumes the H or L state or a third logic state –H with an upper range limit $-H_O$, which is lower than the range limit $L_U$, and with a lower range limit $-H_U$; see FIG. 3c.

This logically three-valued voltage $U_2$ of predeterminable pulse width is generated by means of the conversion stage SC1. To do this, in operation, the potential $U_{21}$ is varied with time in response to the directly applied digital signal txd1, and the potential $U_{22}$ is varied in response to a digital signal derived from, and shifted in phase with respect to, the digital signal txd1. To produce the phase shift, the digital signal txd1 is also applied to an input of a noninverting delay circuit 4 providing a predeterminable delay, and appears at an output of the delay circuit 4 connected to the coil port 22. The difference $U_{21}–U_{22}$ of the two time-varying and out-of-phase potentials $U_{21}$, $U_{22}$ forms the voltage $U_2$ see FIG. 3c. FIGS. 3a and 3b show possible waveforms of the potentials $U_{21}$ and $U_{23}$, respectively, which, for the sake of simplicity, correspond to square-wave signals with a unity mark-to-space ratio.

For the delay circuit 4 of the conversion stage SC1, virtually any delay chain of predeterminable gain and predeterminable signal delay can be used, which can be implemented, for example, with logic gates, cascaded inverters, or noninverting operational amplifiers. The gain of the delay chain must be chosen so that, if $U_{21}$ and $U_{22}$ are at the H level, the voltage U, assumes a value at least equal to the lower range limit L, and not exceeding the upper range limit $L_O$ of the L state.

If a digital signal txd1 with a resulting potential waveform as shown in FIG. 3a or 3b is fed in, and the delay chain has unity gain, the waveform of the voltage $U_2$ shown in FIG. 3c is obtained, which corresponds to the coupling signal txt1.

The delay of the delay circuit 4 must be chosen so that, on the one hand, the pulse width of the voltage $\Delta U_2$ ensures reliable switching of the subsequent conversion stage Sc2, which receives the coupling signal rxd2, and that, on the other hand, the signal potential $U_{22}$ is shifted in phase with respect to the signal potential $U_{22}$ by less than the smallest expected pulse width of the digital signal txd1, e.g., by 100 ns.

The voltage $U_2$, which serves as the coupling signal txt1, is transmitted without a DC component from coil 2 to coil 3, where it appears in the form of a voltage $U_3$ as the likewise three-valued coupling signal rxt2.

Since the waveforms of the potentials $U_{21}$, $U_{22}$, at the two primary-coil ports 21, 22 are the same for all interference signals entering the transmission channel after the delay circuit of the conversion stage SC1, an interference-potential difference $U_2^*$ of a possible interference signal is zero, i.e., such interference is suppressed.

To convert the coupling signal rxt2 to the digital signal rxd2, the conversion stage SC2 comprises a monostable multivibrator 5 with a set input coupled to the coil port 31 and with a noninverting output coupled to the digital-signal port RXD2; the digital-signal port RXD2 can also be formed with an inverting output of the multivibrator 5 followed, if necessary, by a further inverter. Monostable multivibrators, as is well known, have only one stable state, namely either the H state or the L state, from which they can be triggered to change the state for a presettable interval; after this interval, they return to the stable state.

Figure 3D:
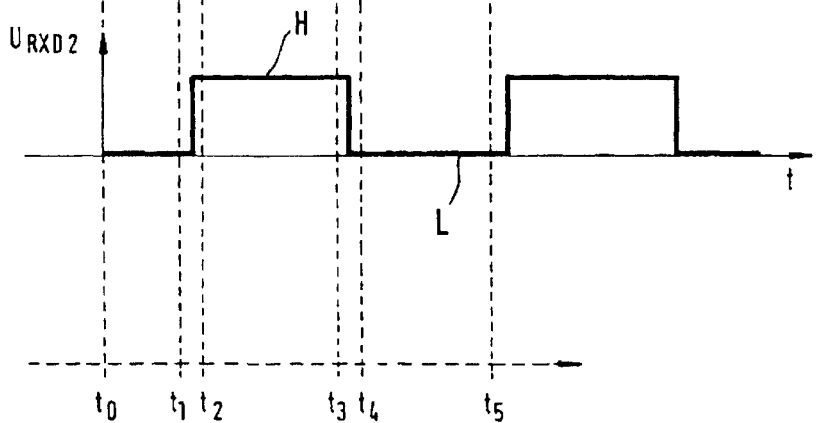

The monostable multivibrator 5 serves to set a potential $U_{RXD2}$ at the digital-signal port RXD2 to the H state on a positive-going edge of the coupling signal rxt2 corresponding to a positive-going edge of the digital signal txd1, and to the L state on a negative-going edge of the coupling signal rxt2 corresponding to a negative-going edge of the digital signal txd1, see FIG. 3d. Positive going edges are changes of potential from one state to a higher state, such as the change from L to H or from –H to L. Negative-going edges are changes of potential from one state to a lower state, such as the change from H to L or from L to –H.

The waveform of the potential $U_{RXD2}$, except for a small delay-induced phase shift and a possible interchange of the sign, then corresponds to that of the digital signal txd1, and thus to a mapping of the digital signal txd1 onto the digital signal rxd2.

In another prefered embodiment of the invention, as shown in FIG. 2, the monostable multivibrator 5 comprises a first inverter 51 with an input coupled to the coil terminal 31, a second inverter 52 with an output coupled to the coil terminal 32, a capacitor 53 with a first terminal 531 coupled to an output of the inverter 52 and with a second terminal 532 coupled to an input of the inverter 52, and a resistor 54 with a first terminal coupled to the input of the inverter 52 and with a second terminal tied to a fixed reference potential U., whose value corresponds to the H state.

The input of the inverter 51 thus serves as the set input of the multivibrator 5. Its output forms the inverting output of the multivibrator 5, and the output of the inverter 52 forms the noninverting output.

The capacitor 53 and the resistor 54 together act as a memory circuit. This memory circuit serves to assign the L state to a potential at an output of the memory circuit on a negative-going edge at an input of the memory circuit, and to temporarily maintain this state. Further, the memory circuit serves to assign the H state to the potential at the memory output on a positive-going edge at the memory input. Thus, this memory circuit makes it possible to set an on time of the multivibrator 5 which is equal to one pulse width of an H state at the noninverting output of the multivibrator 5.

In the embodiment of FIG. 2, the memory input corresponds to the capacitor port 531, while the memory output corresponds to the capacitor port 532. A time constant T proportional to a maximum on time, which is equal to the product of capacitance C and resistance R, must be chosen so that this maximum on time is approximately five times greater than the greatest expected pulse width of the digital signal txd1; it must be at least equal to the expected pulse width. For a maximum pulse width of 1 ms and a resistance value R of, e.g., 47 k$\Omega$, a capacitance C of approximately 100 nF is obtained in the embodiment of FIG. 2.

The operation of the monostable multivibrator 5 will now be explained in more detail with reference to FIGS. 4a to 4f.

In a first static state from a time $t_0$ to a time $t_1$, no digital signal txd1 is transmitted. Accordingly, both coil ports 31, 32 are in the L state and the voltage $AU_3$ is zero, see FIGS. 4a, e, and f.

Figure 4A:
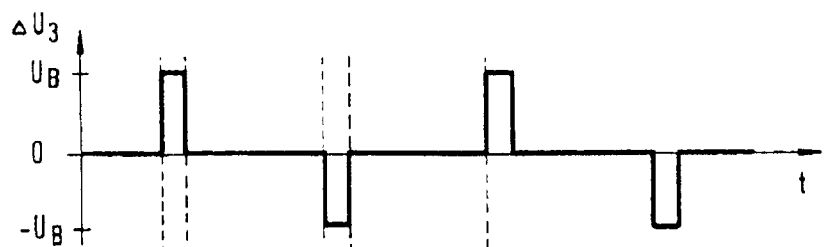
FIGS. 4a to 4f show, by way of example, waveforms of different potentials occurring during operation of the channel of FIG. 2.
Figure 4B:
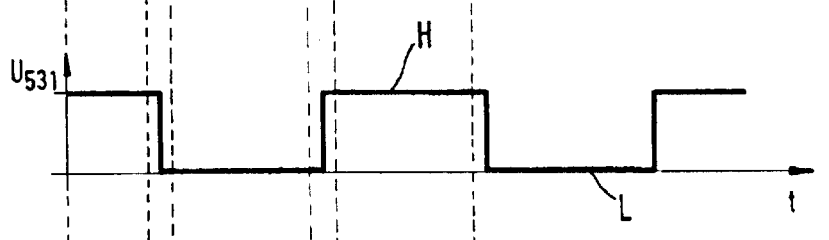
Figure 4C:
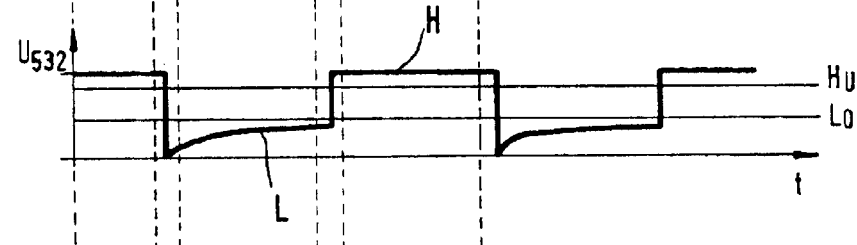
Figure 4D:
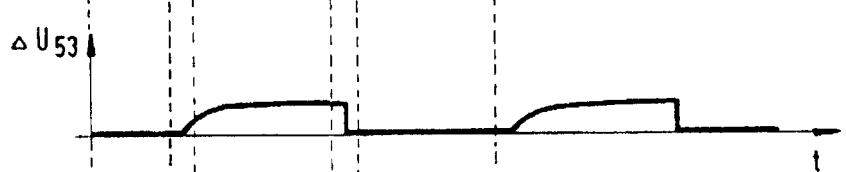
Figure 4E:
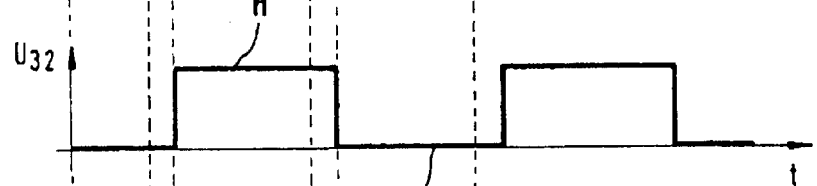
Figure 4F:
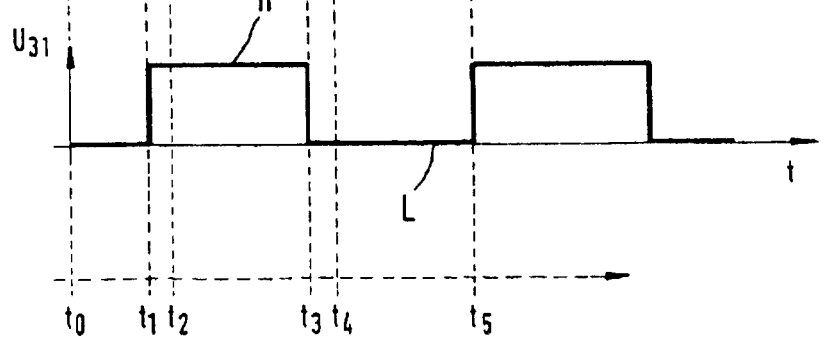

Thus, both capacitor ports 531, 532 are at the reference potential $U_B$ and thus remain in the H state, as shown in FIGS. 4b and c. Therefore, a capacitor voltage $U_{53}$ equal to the difference between a potential $U_{531}$ at the capacitor port 531 and a potential $U_{532}$ at the capacitor 532 is also zero, see FIG. 4d. Consequently, the capacitor 53 is discharged.

On application of the digital signal txd1 with a positive-going edge at a time teas shown in FIG. 3a, the potential $U_{31}$ at the coil port 31 changes from zero to a higher value corresponding to the H state.

As a result, the capacitor potential $U_{531}$, delayed by a propagation delay through the inverter 51 with respect to the positive-going edge, is set to a value for the L state. Because of the integrating action of the capacitor 53 with respect to the capacitor voltage $U_{53}$, the capacitor port 532 immediately assumes the capacitor potential $U_{532}$, which is zero. Again with a delay equal to the propagation delay, the output of the inverter 52 changes to the H state. The multivibrator 5 is now in a second state, which lasts from the time $t_1$ to a time $t_2$.

During the second state, the capacitor 53 is slowly charged according to an e-function determined by the time constant T. As a result, the capacitor potential $U_{532}$ approaches the reference potential U, again. The greater the time constant T is chosen, the more slowly the capacitor 53 will become charged and the more slowly the capacitor potential $U_{532}$ will increase.

According to the predetermined delay introduced by the delay circuit of the conversion stage Sc1, the voltage $U_2$ across the two coil ports 21, 22 is nonzero for only a short time. When the voltage $U_2$ changes to zero at the time $t_2$, the potential $U_{31}$, at the coil terminal 31 is held at the value of the potential $U_{32}$ at the coil terminal 32, which, because of the slow charging of the capacitor 53, is still in the H state.

Thus, the capacitor terminal 531 remains in the L state, and the capacitor 53 continues to be charged. The capacitor voltage $U_{53}$ also approaches a value corresponding to the reference potential $U_B$ according to the above-described e-function. From the time $t_2$ to a time $t_3$, the multivibrator 5 is in a third state. The time between $t_2$ and $t_3$ corresponds to the on time of the monostable multivibrator 5.

After a time corresponding to the pulse width of the digital signal to be transmitted, at instant $t_3$, the potential $U_{31}$ at the coil terminal 31 changes from the H state to a lower value corresponding to the L state. Accordingly, the capacitor potential $U_{531}$ changes to the reference potential $U_B$, i.e., the H state.

A momentary difference between the capacitor potential $U_{531}$ and the capacitor potential $U_{532}$ is again compensated for practically without delay, so that the input of the second inverter 52 immediately assumes the reference potential $U_B$ and the capacitor 53 is discharged again. Thus, from the time $t_3$ to a time $t_4$, the multivibrator 5 is in a fourth state.

On the subsequent change of the voltage $U_2$ from the value for the H state to zero, at the time $t_4$, the multivibrator 5 changes to a fifth state, which lasts until a time $t_5$. During the fifth state, analogously the third state, the coil port 31 is at the potential $U_{32}$ of the coil port 32, which is equal to the reference potential $U_B$.

The waveforms of the potentials $U_{531}$, $U_{32}$, and $U_{31}$ appearing at the outputs of the inverters 51, 52 and at the input of the inverter 51, respectively, correspond to the waveform of the digital signal to be transmitted, txd1, as far as the order and the time distances between the positive-going and negative-going edges are concerned, with the potential $U_{531}$ at the output of the inverter 51 representing the waveform of the digital signal txd1 with opposite signs, i.e., practically to a digital signal –rxd1, which can be readily changed into the digital signal rxd1 by subsequent inversion.

As the digital-signal port RXD2 can assume only one stable state, after termination or abnormal termination of the signal transmission, the transmission channel changes to a defined output state or quiescent state.

As shown in FIG. 2, the coil terminal 21 is connected directly to the digital-signal port TXD1, and the coil terminal 31 is connected practically directly to the digital-signal port RXD2. If the set input of the multivibrator 5 is coupled to the coil terminal 32, and the noninverting output of the multivibrator 5 is coupled to the coil terminal 31, an additional phase shift of the digital signal rxd2 with respect to the digital signal txd1 is obtained, which is due to the fact that instead of the edges of the coupling signal rxt2 corresponding to the edges of the digital signal txd1, only the edges of the coupling signal rxt2 corresponding to the respective edges of the digital signal at the output of the delay circuit 4 now trigger or reset the multivibrator 5.

The delay provided by the delay circuit 4 must be at least equal to a delay with which a change of the potential $U_{31}$ at the set input of the multivibrator 5 causes a change of the potential $U_{32}$.

The required quality of the electrical isolation of the transmission channel is determined essentially by the design of the transformer, and can thus be guaranteed in a simple manner and over a wide range of application. Another advantage is that no special-purpose components are necessary, so that high transmission reliability can be achieved at low cost.

According to a second variant of the invention, the transmission channel serves to transmit digital signals, e.g., for the purpose of data communication, between a first and a second transmitter/receiver unit (not shown) in a selectable first direction or a selectable second direction, providing electrical isolation. The digital signal can again be any two-valued electric signal of predeterminable pulse width and pulse repetition rate and of predeterminable mark-to-space ratio.

As the transmission channel for transmitting the digital signals operates bidirectionally in a half-duplex mode, i.e., as it permits transmission in only one direction at a time, it can be used, for example, to implement potential-separated serial interfaces of microprocessor systems or modems.

Figure 5:
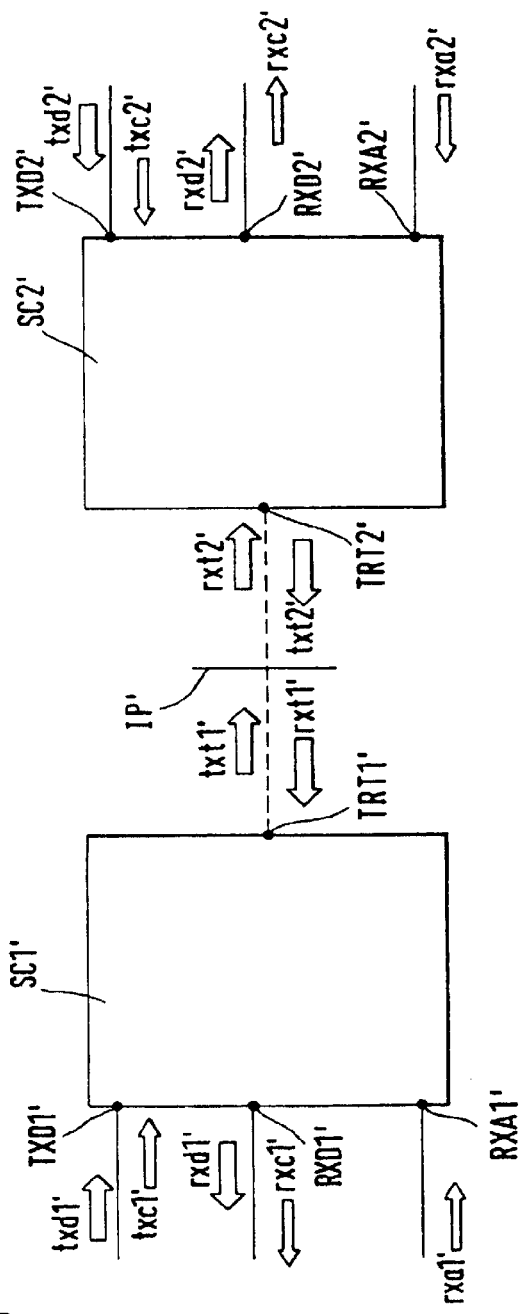
FIG. 5 is a schematic block diagram of a transmission channel for the electrically isolated, bidirectional transmission of digital signals.

As shown in FIG. 5, the transmission channel for half-duplex operation comprises a first deactivatable digital-signal port TXD1' for a first digital signal to be transmitted, txd1', a second deactivatable digital-signal port RXD2' for a transmitted second digital signal rxd2', a third deactivatable digital-signal port TXD2' for a third digital signal to be transmitted, txd2', and a fourth deactivatable digital-signal port RXD1' for a transmitted fourth digital signal rxd1'. "Deactivatable" as used herein means that, on application of suitable control signals, the respective digital-signal port can assume, besides an active, signal-passing state, an inactive, signal-blocking state.

The transmission channel further comprises a first selection signal port RXA1' for a binary first selection signal rxa1' serving to activate or deactivate the digital-signal ports TXD1', RXD1' as well as a second selection signal port RXA2' for a binary second selection signal rxa2' serving to activate or deactivate the digital-signal ports TXD2', RXD2'.

In the second variant of the invention, the first direction of transmission of the transmission channel is set by activating the two digital-signal ports TXD1', RXD2' and deactivating the two digital-signal ports RXD1', TXD2'. Similarly, the second direction of transmission is set op by activating the digital-signal ports TXD2', RXD1' and deactivating the digital-signal ports RXD2', TXD1'. "Deactivated" means that the respective digital-signal port has a signal-blocking effect, i.e., that a digital signal appearing at such a port is not passed to subsequent circuit components of the transmission signal or to the connected transmitter/receiver unit. "Activated" means that signals appearing at the respective digital-signal port are passed. The activatable and deactivatable digital-signal ports TXD1', TXD2', TXD2', RXD1' can be implemented with all circuits familiar to those skilled in the art which can be set to a signal-passing state and a signal-blocking state in response to corresponding control signals, such as driver circuits implemented with open collector outputs or with tri-state buffers.

Figure 7:
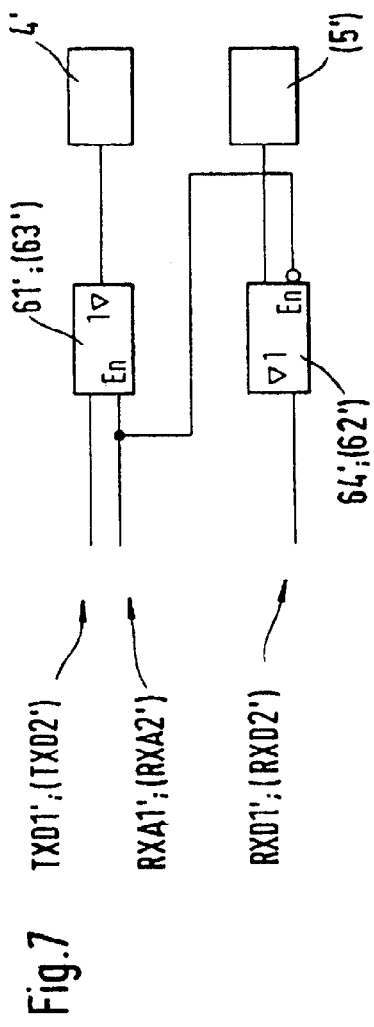
FIG. 7 is a schematic circuit diagram of another bidirectional driver circuit for the transmission channel of FIG. 5.

To implement the deactivatable digital-signal ports, in another embodiment of the invention, shown in FIG. 7, the transmission channel comprises a first tri-state buffer 61', a second tri-state buffer 62', a third tri-state buffer 63', and a fourth tri-state buffer 64'. Tri-state buffers, as is well known, are circuit elements which can be set very quickly to a high-impedance, signal-blocking state or a low-impedance, signal-passing state by application of a binary selection signal to an additional selecting input En. Thus, a change of a signal potential applied at the input end of the tri-state buffer will cause a corresponding change of a signal potential appearing at the output end of the buffer only if the buffer is in the active state. If the buffer is in the inactive state, the signal potential appearing at the output end will be unaffected by the signal potential at the input end. Tri-state buffers of the kind described can be both inverting and noninverting circuit elements.

As shown in FIG. 7, one input of the buffer 61' serves as the digital-signal port TXD1', and an output of the buffer 62' serves as the digital-signal port RXD2'. One input of the buffer 63' serves as the digital-signal port TXD2', and an output of the buffer 64' serves as the digital-signal port RXD1'. Furthermore, in the embodiment of FIG. 7, the selection signal ports RXA1' and RXA2' are implemented by a noninverting port of the buffer 61' coupled to an inverting port of the buffer 62' and by a noninverting port of the buffer 63' coupled to an inverting port of the buffer 64'. The selection signals rxa1', rxa2' for selecting the first or second direction of transmission must be implemented in such a way that the tri-state buffers 63' and 64' are in a high-impedance, i.e., signal-blocking, condition if the first direction of transmission has been selected, and that the tri-state buffers 61' and 62' are in a high-impedance condition if the second direction of transmission has been selected.

For the transmission of the digital signals txd1', txd2', the transmission channel of FIG. 5 further comprises a first conversion stage SC1' with a coupling-signal port TRT1' and a second conversion stage SC2' with a coupling-signal port TRT2' as well as a single isolating path IP' coupled between the coupling-signal ports TRT1', TRT2' and having a predeterminable isolation capability.

If the first direction of transmission has been selected, the conversion stage SC1' serves to convert the digital signal txd1' to a first coupling signal txt1', which appears at the coupling-signal port TRT1' and is transmissible across the isolating path IP', and the conversion stage SC2' serves to convert a second coupling signal rxt2', transmitted across the isolating path IP' and applied at the coupling-signal port TRT2', to the digital signal rxd2'. If the second direction of the transmission has been selected, the conversion stage SC2, serves to convert the digital signal txd2' to a third coupling signal txt2', which appears at the coupling-signal port TRT2' and is transmissible across the isolating path IP', and the conversion stage SC1' serves to convert a fourth coupling signal rxt1', transmitted across the isolating path IP' and applied at the coupling-signal port TRT1', to the digital signal rxd1'.

Similarly, the isolating path IP', besides suppressing interference signals as mentioned above, serves to change the coupling signal txt1' into the coupling signal rxt2' applied at the coupling-signal port TRT2' if the first direction of transmission has been selected, and to change the coupling signal txt2' into the coupling signal rxt1' applied at the coupling-signal port TRT1' if the second direction of transmission has been selected.

Figure 6:
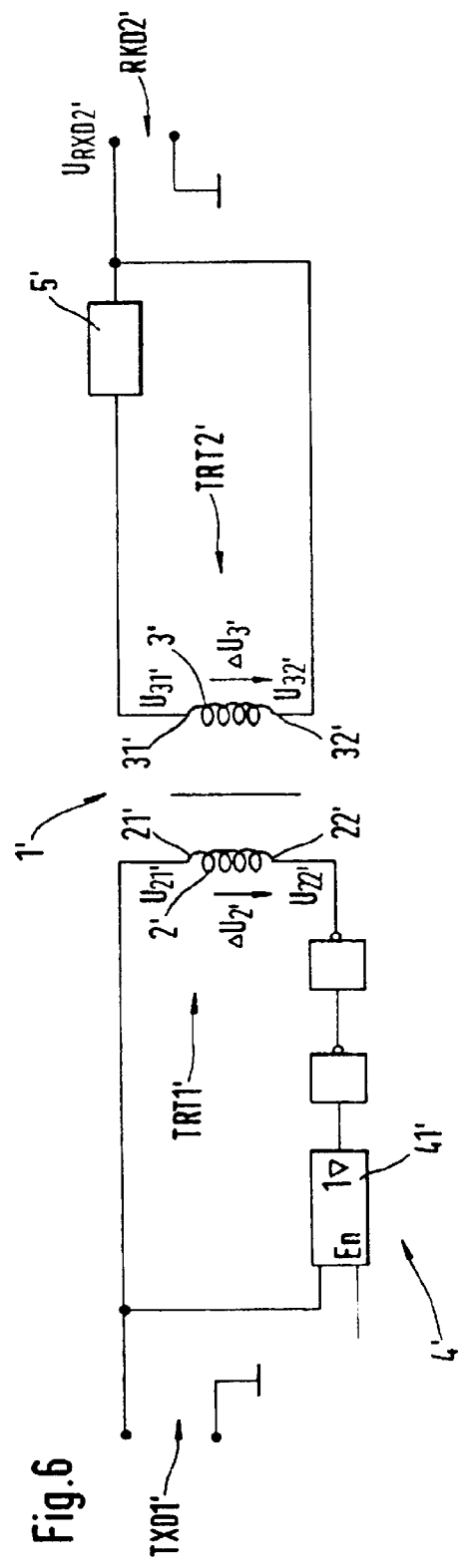
FIG. 6 is a schematic circuit diagram of a bidirectional driver circuit for the transmission channel of FIG. 5.

In one embodiment of the second variant of the invention, the isolating path IP', analogously to the first variant of the invention, is a transformer air gap between a coil 2' of the conversion stage SC1', which serves as a first transformer winding, and a coil 3' of the conversion stage SC2', which serves as a second transformer winding, as shown in FIG. 6. It can also be implemented with a transformer embedded in insulating material and/or with transformers connected in series, as mentioned above.

The coil 2' has a first terminal 21' connected to a first potential $U_{21}$ and a second terminal 22' connected to a second potential $U_{22}$. Similarly, the coil 3' has a first terminal 31' connected to a third potential $U_{31}$ and a terminal second port 32' connected to a fourth potential $U_{32}$.

In a further embodiment of the second variant of the invention, as shown in FIG. 6, for the first direction of transmission, the conversion stage SC1' comprises a delay circuit 4' which serves to derive a phase-shifted digital signal from the digital signal txd1' in the manner described above. This digital signal is applied to the coil port 32' and thus causes a change of the potential $U_{32}$. The digital signal txd1' is also applied directly to the coil port 31', so that a logically three-valued voltage equal to a difference $U_{31}-U_2$ appears across the coil 3'.

As in the case of the conversion stage SC1, noninverting delay chains with a predeterminable delay can be used for the delay circuit 4' of the conversion stage SC1'.

If the delay circuit 4' is to be switchable into and out of circuit in operation, in a preferred embodiment, it includes at least one tri-state buffer 41'.

Furthermore, the conversion stage SC2' comprises, at least for the first direction of transmission, a multivibrator 5' for converting the coupling signal rxt2' to the digital signal rxd2'. The multivibrator 5' has a set input coupled to the coil port 31' and an output, particularly a noninverting output, coupled to the digital-signal port RXD2', and has at least one stable state. Similarly, for the second direction of transmission, the conversion stage SC1' may comprise a corresponding multivibrator (not shown) for converting the coupling signal rxt1' to the digital signal rxd1'.

The multivibrator 5' again serves to assign the H state to a potential $U_{RXD2}'$ at the digital-signal port RXD2' on a positive-going edge of the coupling signal rxt1' associated with a positive-going edge of the digital signal txd1', and the L state to the potential $U_{RXD2}'$ on a negative-going edge of the coupling signal rxt2' associated with a negative-going edge of the digital signal txd2'.

In a further embodiment of the invention, for the first direction of transmission, the time variation of the potential $U_{RXD2}'$ is realized by implementing the multivibrator 5' of the conversion stage SC2' as a flip-flop, which can assume two stable states, cf., for example, DE-A 36 14 832, WO-A 89/12366. Of course, a flip-flop may also be included in the conversion stage SC1' for changing the potential $U_{RXD2}'$ if the second direction of transmission has been selected.

Figure 8:
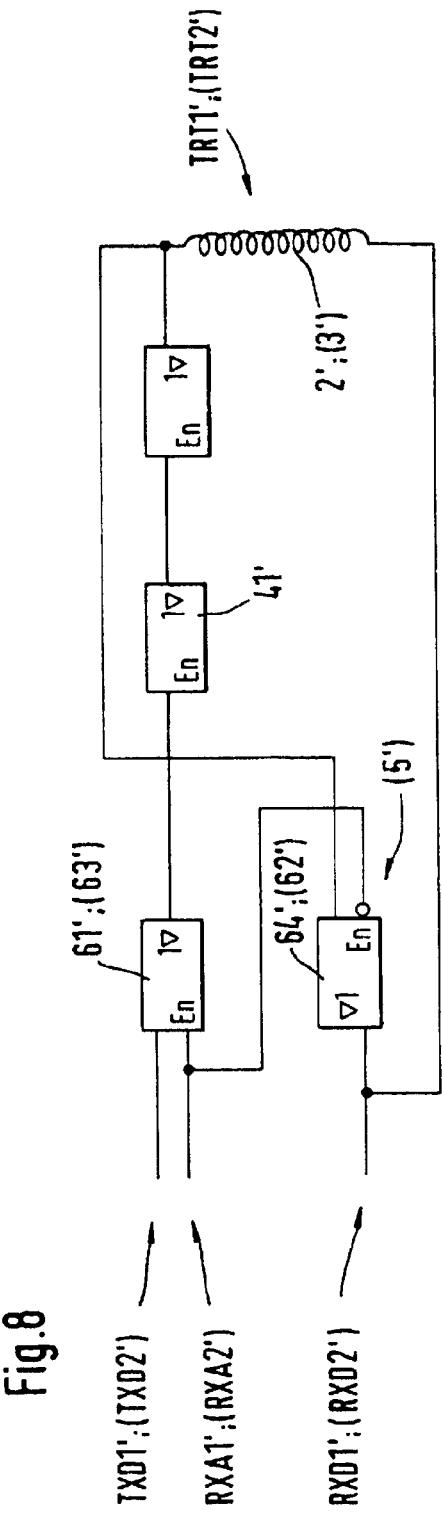
FIG. 8 is a schematic circuit diagram of a further bidirectional driver circuit for the transmission channel of FIG. 5.

In a further embodiment of the invention, the tri-state buffer 62, as shown in FIG. 8, serves as a flip-flop 5' of the conversion state SC2' for the first direction of transmission. To this end, the tri-state buffer 62 is implemented as a noninverting tri-state buffer whose input and output are connected directly to the coil ports 31' and 32', respectively. Similarly, a noninverting tri-state buffer 64 having its input and output connected directly to the coil ports 22' and 21', respectively, may serve as a flip-flop of the conversion stage SC1'.

In another embodiment of the invention, for the first direction of transmission, the time variation of the potential $U_{RXD2}'$ is realized by implementing the multivibrator 5' of the conversion stage SC2' as a monostable multivibrator, particularly in the manner of the multivibrator 5 of the first variant of the invention, shown in FIG. 2.

If the multivibrator 5 is used for the second variant of the invention, the inverters 51, 52 of FIG. 2 can also be implemented as inverting tri-state buffers, which can be enabled by the selection signal rxa2', for example.

By means of the deactivated or activated digital-signal ports TXD1', RXD1', TXD2', RXD2', the first and second directions of transmission are set in such a manner that the transmission of digital signals corresponding to a direction not set would be blocked. To avoid any loss of data in such a data exchange, the data to be transmitted have to be stored temporarily, e.g. in a shift register, and the setting of the directions of transmission must be coordinated with the transmission of the respective digital signals in a suitable manner, e.g. by clock control and/or event control. This can be done in a master-slave mode, for example.

In transmission channels operated in this way, the event-driven setting of the directions of transmission by means of the selection signals rxa1', rxa2' is accomplished using corresponding digital control signals which have predetermined control-bit sequences, particularly in accordance with a standardized interface protocol. To generate the selection signals rxa1', rxa2', these control signals are transmitted ahead of and, if necessary, after the digital signals txd1', txd2', so they can also be transmitted across the isolating path.

The control signals and the selection signals rxa1', rxa2' can be generated using any of the control circuits for such a serial data exchange which are familiar to those skilled in the art, such as bus controllers or modem controllers, as well as corresponding control methods, e.g., methods implemented in a microprocessor. The control circuits can be incorporated directly in the transmission channel or in at least one of the transmitter/receiver units, for example. If the transmission channel is used in a bus system, each of the digital-signal ports TXD1', RXD2', TXD2', RXD1' must be assigned a corresponding distinguishable bus address and the above-mentioned control circuit must incorporate suitable address control means. Furthermore, the selection-signal ports RXA1', RXA2' must be connected to a corresponding address bus.

The control signals may be carried, for example, on additional, separate control lines originating from the control circuit; they can also be implemented as a control-bit sequence preceding and, if necessary, following the data bits of the digital signals to be transmitted, as is commonly done in such serial interfaces, and thus can be fed to the transmission channel like the corresponding digital signal.

In a further embodiment of the invention, therefore, the transmission channel also serves to transmit digital control signals between a first and a second control circuit (not shown).

In a further embodiment of the second variant of the invention, the first control circuit is connected to the digital-signal port TXD1', RXD1', and the second control circuit is connected to the digital-signal ports TXD2', RXD2', with each of the digital-signal ports TXD1', RXD2', TXD2', RXD1' being acivated in an initial state of the transmission channel. At a point of time prior to the application of the digital signal txd1', the digital-signal port TXD1 is fed with a digital first control signal txc1' which is then converted, in the manner described above, into a transmitted digital second control signal rxc2' appearing at the digital-signal port RXD2'. The control signal rxc2' is fed to the second control circuit, which derives therefrom the selection signal rxa2' and any further digital control signal to be transmitted to the first control circuit. Similarly, at a point of time prior to the application of the digital signal txd2', the digital-signal port TXD2' is supplied with a digital third control signal txc2', which is converted to a transmitted digital fourth control signal rxc1' appearing at the digital-signal port RXD1. The control signal rxc1' is fed to the first control circuit, which derives therefrom the selection signal rxa1' and any further digital control signal to be transmitted to the second control circuit.

The transmission channel may, of course, have additional control-signal ports, which are connected to separate control lines. The control signals can also be fed to further conversion stages in a corresponding manner.

What is claimed is:

1. A transmission channel for transmitting digital signals with a first digital-signal port for a first digital signal to be transmitted, and with a second digital-signal port for a transmitted second digital signal, said transmission channel comprising:

an isolating path with a predeterminable isolation capability;

a first conversion stage having a coupling-signal port for a first coupling signal transmissible across the isolating path; and a second conversion stage having a coupling-signal port for a second coupling signal transmissible across the isolating path, the isolating path being provided between a coil of the first conversion stage and a coil of the second conversion stage, and the second conversion stage converting the second coupling signal to the second digital signal by means of a monostable multivibrator having a set input coupled to the second coupling signal port and having an output coupled to the second digital-signal port, said second digital signal representing said first digital signal.

2. A transmission channel as claimed in claim 1 wherein the first conversion stage comprises a delay circuit providing a predetermined delay and having an input fed by the first digital signal and an output coupled to the second coil port of the first coil.

3. A transmission channel as claimed in claim 2 wherein the first coupling signal and/or the second coupling signal are three-valued logic signals.

4. A transmission channel for transmitting digital signals
   with a first digital-signal port for a first digital signal to be transmitted, and
   with a second digital-signal port for a transmitted second digital signal, said transmission channel comprising:
   an isolating path with a predeterminable isolation capability;
   a first conversion stage
      having a coupling-signal port for a first coupling signal transmissible across the isolating path; and
   a second conversion stage
      having a coupling-signal port for a second coupling signal transmissible across the isolating path,
   the isolating path being provided between a coil of the first conversion stage and a coil of the second conversion stage, and
   the second conversion stage converting the second coupling signal to the second digital signal by means of a monostable multivibrator
      having a set input coupled to the second coupling signal port and
      having an output coupled to the second digital-signal port
   wherein the multi vibrator comprises:
      a capacitor of predeterminable capacitance having
         a first capacitor terminal and
         a second capacitor terminal;
      a resistor of predeterminable resistance having
         a first resistor terminal connected to the second capacitor port and
         a second resistor terminal connected to a reference potential;
      a first inverter having
         an inverter input connected to the first coil terminal of the second coil and
         an inverter output connected to the first capacitor terminal; and
      a second inverter having
         an inverter input connected to the second capacitor terminal and
         an inverter output connected to the second coil terminal of the second coil.

5. A transmission channel as claimed in claim 4 wherein the first conversion stage comprises a delay circuit providing a predetermined delay and having an input fed by the first digital signal and an output coupled to the second coil port of the first coil.

6. A transmission channel as claimed in claim 4 wherein the first coupling signal and/or the second coupling signal are three-valued logic signals.

7. A transmission channel for transmitting digital signals in a first direction settable during operation or in a second direction settable during operation, with
   a deactivatable first digital-signal port for a first digital signal to be transmitted,
   a deactivatable second digital-signal port for a transmitted second digital signal, said second digital signal representing said first digital signal,
   an activatable third digital-signal port for a third digital signal to be transmitted, and
   an activatable fourth digital-signal port for a transmitted fourth digital signal, said fourth digital signal representing said third digital signal,
   said transmission channel comprising:
   an isolating path with a predeterminable isolation capability;
   a first conversion stage
      having a coupling-signal port for a first coupling signal transmissible across the isolating path or for a second coupling signal transmissible across the isolating path; and
   a second conversion stage
      having a coupling-signal port for a third coupling signal transmissible across the isolating path or for a fourth coupling signal transmissible across the isolating path,
   the isolating path being provided between a coil of the first conversion stage and a coil of the second conversion stage,
   the third digital-signal port and the fourth digital signal port being deactivated when the first direction of transmission has been selected, and
   the first digital-signal port and the second digital-signal port being deactivated when the second direction of transmission has been selected,
   wherein the second conversion stage comprises a monostable multivibrator, said monostable multivibrator being controlled by said second coupling signal and said monostable multivibrator being coupled to said second digital-signal port.

8. A transmission channel as claimed in claim 7 wherein the first conversion stage comprises a delay circuit providing a predetermined delay and having an input fed by the first digital signal and an output coupled to the second coil port of the first coil.

9. A transmission channel as claimed in claim 7 wherein the first coupling signal and/or the third coupling signal are three-valued logic signals.

10. A transmission channel as claimed in claim 7, comprising:
   a first selection-signal port for a first selection signal serving to deactivate the first digital-signal port or the third digital-signal port; and
   a second selection-signal port for a second selection signal serving to deactivate the second digital-signal port or the fourth digital-signal port.

11. A transmission channel as claimed in claim 10, comprising:
   a first tri-state buffer having an input coupled to the first digital-signal port;
   a second tri-state buffer having an output coupled to the second digital-signal port;
   a third tri-state buffer having an input coupled to the third digital-signal port; and
   a fourth tri-state buffer having an output coupled to the fourth digital-signal port,
   wherein, if the first direction of transmission has been selected,
      the first and second tri-state buffers are in a low-impedance state and
      the third and fourth tri-state buffers are in a high-impedance state, and
   wherein, if the second direction of transmission has been selected, the first and second tri-state buffers are in a high-impedance state and the third and fourth tri-state buffers are in a low-impedance state.

12. A transmission channel as claimed in claim 10 wherein the first conversion stage comprises a delay circuit providing a predeterminable delay and having an input fed by the first digital signal and an output coupled to the second coil port of the first coil.

13. A transmission channel as claimed in claim 10 wherein the first conversion stage comprises a delay circuit providing a predetermined delay and having an input fed by the first digital signal and an output coupled to the second coil port of the first coil.

14. A transmission channel as claimed in claim 10 wherein the first coupling signal and/or the third coupling signal are three-valued logic signals.

15. A transmission channel as claimed in claim 7, comprising:

a first tri-state buffer having an input coupled to the first digital-signal port;

a second tri-state buffer having an output coupled to the second digital-signal port;

a third tri-state buffer having an input coupled to the third digital-signal port; and a fourth tri-state buffer having an output coupled to the fourth digital-signal port, wherein, if the first direction of transmission has been selected, the first and second tri-state buffers are in a low-impedance state and the third and fourth tri-state buffers are in a high-impedance state, and wherein, if the second direction of transmission has been selected, the first and second tri-state buffers are in a high-impedance state and the third and fourth tri-state buffers are in a low-impedance state.

16. A transmission channel as claimed in claim 15 wherein the first conversion stage comprises a delay circuit providing a predeterminable delay and having an input fed by the first digital signal and an output coupled to the second coil port of the first coil.

17. A transmission channel as claimed in claim 15 wherein the first conversion stage comprises a delay circuit providing a predetermined delay and having an input fed by the first digital signal and an output coupled to the second coil port of the first coil.

18. A transmission channel as claimed in claim 15 wherein the first coupling signal and/or the third coupling signal are three-valued logic signals.

19. A transmission channel for transmitting digital signals with a first digital-signal port for a first digital signal to be transmitted, and with a second digital-signal port for a transmitted second digital signal, said transmission channel comprising:

an isolating path with a predeterminable isolation capability;

a first conversion stage having a coupling-signal port for a first coupling signal transmissible across the isolating path; and a second conversion stage having a coupling-signal port for a second coupling signal transmissible across the isolating path, the isolating path being provided between a coil of the first conversion stage and a coil of the second conversion stage, and the second conversion stage converting the second coupling signal to the second digital signal by means of a monostable multivibrator having a set input coupled to the second coupling signal port and having an output coupled to the second digital-signal port, wherein the first conversion stage comprises a delay circuit providing a predetermined delay and having an input fed by the first digital signal and an output coupled to the second coil port of the first coil, the delay circuit comprises a tri-state buffer.

20. A transmission channel as claimed in claim 19 wherein the first coupling signal and/or the second coupling signal are three-valued logic signals.

21. A transmission channel for transmitting digital signals with a first digital-signal port for a first digital signal to be transmitted, and with a second digital-signal port for a transmitted second digital signal, said transmission channel comprising:

an isolating path with a predeterminable isolation capability;

a first conversion stage having a coupling-signal port for a first coupling signal transmissible across the isolating path; and a second conversion stage having a coupling-signal port for a second coupling signal transmissible across the isolating path, the isolating path being provided between a coil of the first conversion stage and a coil of the second conversion stage, and the second conversion stage converting the second coupling signal to the second digital signal by means of a monostable multivibrator having a set input coupled to the second coupling signal port and having an output coupled to the second digital-signal port, wherein the first coupling signal and/or the second coupling signal are three-valued logic signals.

22. A transmission channel as claimed in claim 21 wherein the first coupling signal and/or the second coupling signal is a voltage appearing across the coil of the first conversion stage.

23. A transmission channel with a first digital-signal port for a first digital signal to be transmitted and with a second digital-signal port for a transmitted second digital signal, said transmission channel comprising:

a first conversion stage, a second conversion stage, and an isolating path, said isolating path being coupled to a coupling-port of said first conversion stage and to a coupling-port of said second conversion stage, said first conversion stage converting said first digital signal to a first coupling signal, which appears at said coupling-port of the first conversion stage and is transmissible across said isolating path, and said second conversion stage converting a second coupling signal, which is applied at said coupling-port of the second conversion stage, to said second digital signal, wherein the second conversion stage includes a monostable multivibrator having a set input coupled to said coupling-signal port of the second conversion stage and an output coupled to said second digital-signal port, and wherein a waveform of a potential appearing at said second digital-signal port corresponds with a waveform of said first digital signal.

24. The transmission channel as claimed in claim 23 wherein the first and second digital signals have equal pulse widths.

25. The transmission channel as claimed in claim 23 wherein the first and second digital signals have equal pulse repetition rate.

26. The transmission channel as claimed in claim 23 wherein the potential appearing at said second digital-signal port has positive-going edges corresponding to positive-going edges of said first digital signal and negative-going edges corresponding to negative-going edges of said first digital signal.

27. The transmission channel as claimed in claim 23 wherein the second coupling signal is a three-valued logic signal.

28. The transmission channel as claimed in claim 27 wherein the second coupling signal is a pulse signal having positive-going and negative-going pulses.

* * * * *